United States Patent
Schroeder et al.

(10) Patent No.: US 11,512,896 B2
(45) Date of Patent: Nov. 29, 2022

(54) REFRIGERATOR APPLIANCE HAVING A MOVABLE CAMERA

(71) Applicant: Haier US Appliance Solutions, Inc., Wilmington, DE (US)

(72) Inventors: Michael Goodman Schroeder, Louisville, KY (US); Sarah Virginia Morris, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 282 days.

(21) Appl. No.: 17/011,066

(22) Filed: Sep. 3, 2020

(65) Prior Publication Data
US 2022/0065524 A1 Mar. 3, 2022

(51) Int. Cl.
*F25D 29/00* (2006.01)
*F25D 25/02* (2006.01)

(52) U.S. Cl.
CPC .......... *F25D 29/005* (2013.01); *F25D 25/02* (2013.01); *F25D 2325/021* (2013.01); *F25D 2400/361* (2013.01); *F25D 2500/06* (2013.01); *F25D 2700/06* (2013.01)

(58) Field of Classification Search
CPC . H04N 5/2257; F25D 29/005; F25D 2500/06; F25D 2700/06
See application file for complete search history.

(56) References Cited

U.S. PATENT DOCUMENTS

2018/0245840 A1* 8/2018 Chen ................ F25D 29/00

FOREIGN PATENT DOCUMENTS

| CN | 207351036 U | 5/2018 |
|---|---|---|
| CN | 108800749 A | 11/2018 |
| CN | 105222503 B | 3/2019 |
| CN | 110455027 A | 11/2019 |
| EP | 3617635 A1 | 3/2020 |
| JP | 2002267337 A | 9/2002 |
| JP | 2003042626 A | 2/2003 |
| JP | 6095551 B2 | 3/2017 |

* cited by examiner

*Primary Examiner* — Lionel Nouketcha
(74) *Attorney, Agent, or Firm* — Dority & Manning, P.A.

(57) ABSTRACT

A refrigerator appliance, as provided herein, may include a cabinet, a door, and a camera module. The cabinet may define a chilled chamber. The door may be rotatably hinged to the cabinet to provide selective access to the chilled chamber. The camera module may be movably mounted to the cabinet (e.g., above a support shelf). The camera module may be movable on the cabinet along a predefined direction between a retracted position proximal to a first end of the cabinet and an extended position proximal to a second end of the cabinet. The camera module may be directed at the chilled chamber in the extended position to capture an image thereof.

19 Claims, 11 Drawing Sheets

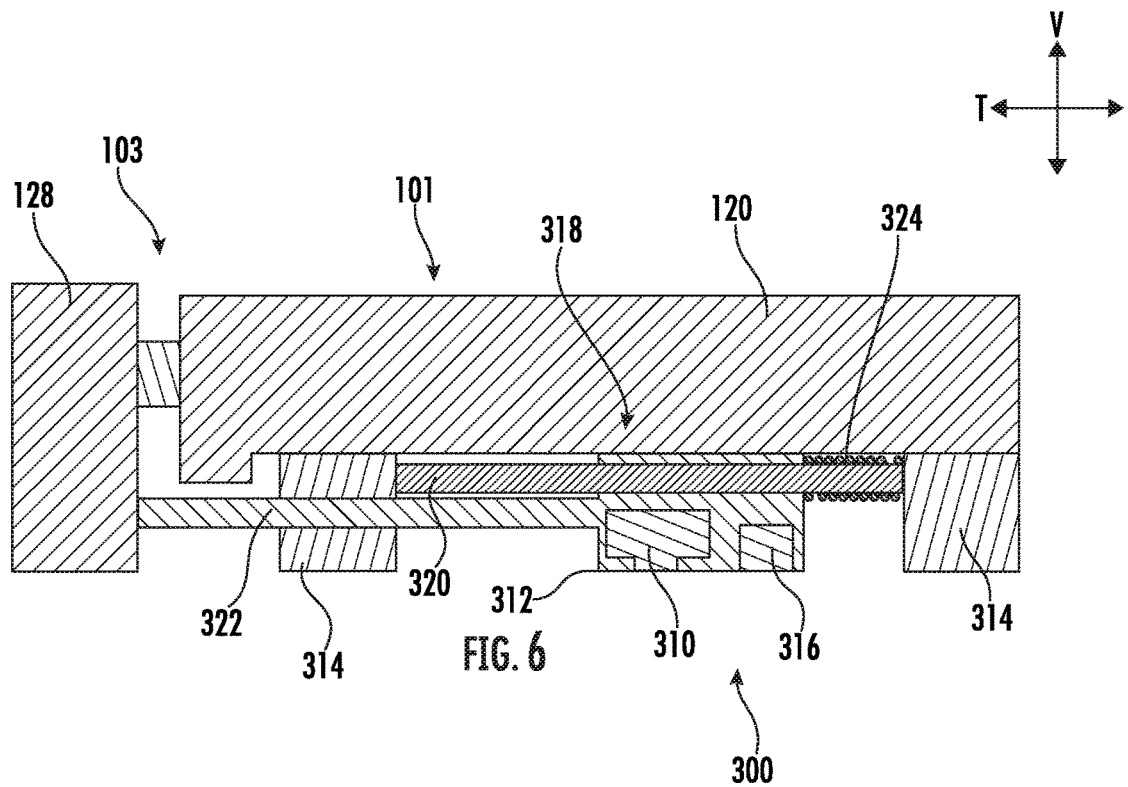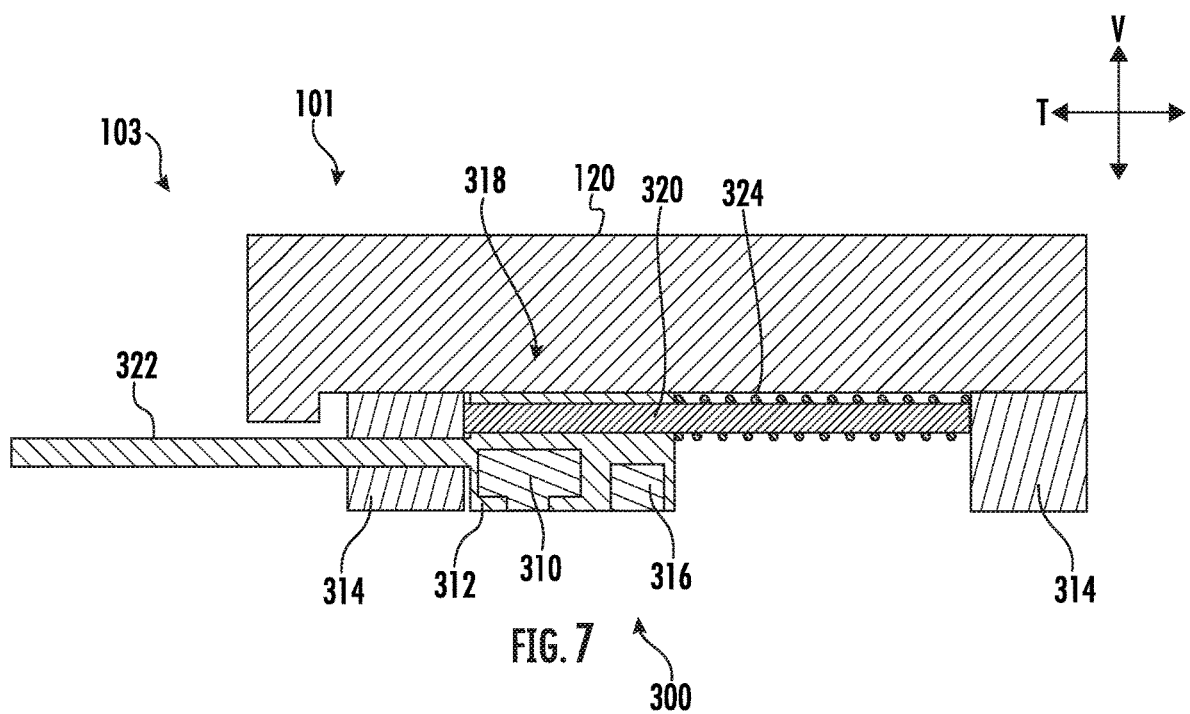

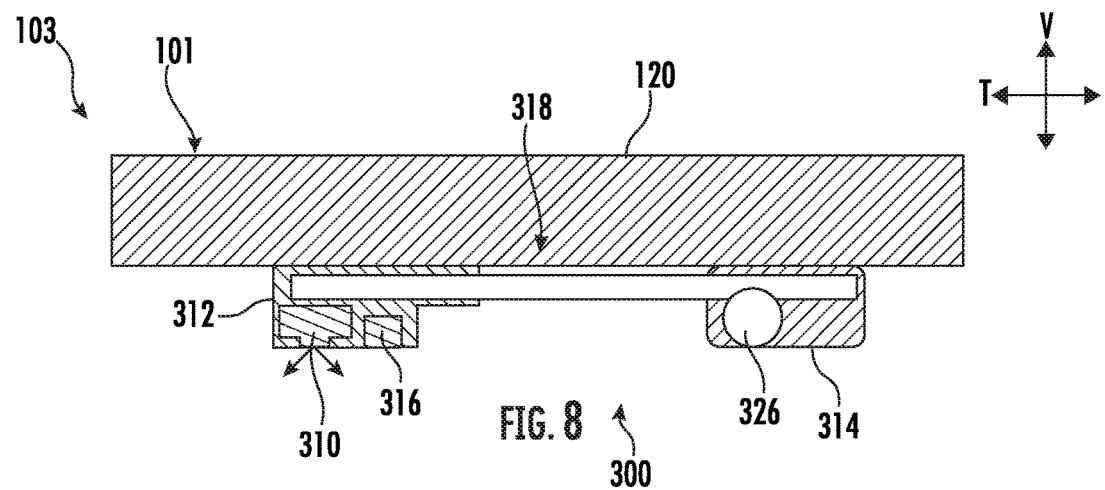
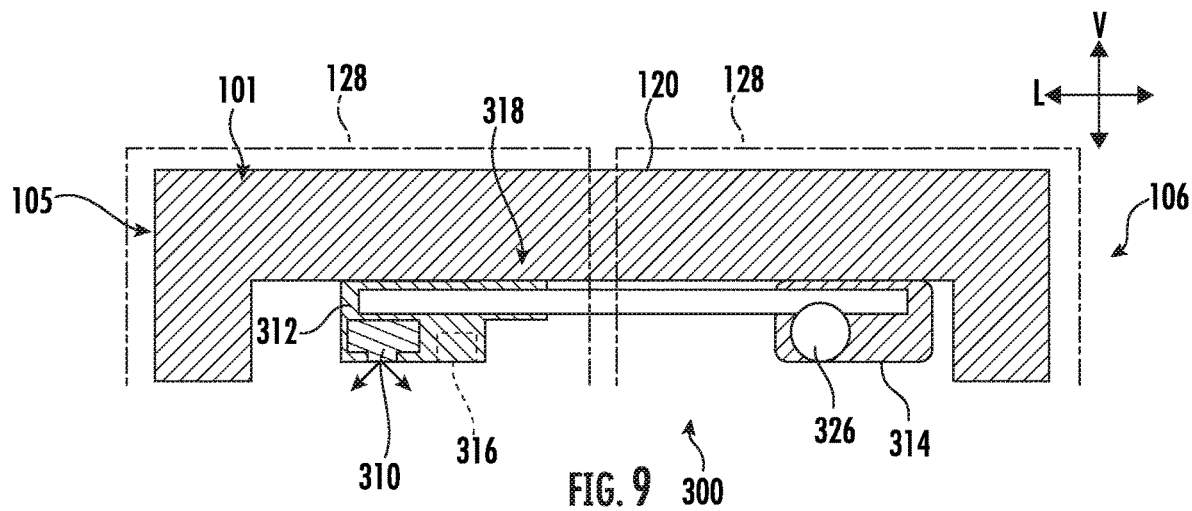

REFRIGERATOR APPLIANCE HAVING A MOVABLE CAMERA

FIELD OF THE INVENTION

The present subject matter relates generally to refrigerator appliances, and more particularly to a refrigerator appliance having one or more cameras for capturing images or videos of a portion of the refrigerator appliance.

BACKGROUND OF THE INVENTION

Storage enclosures, such as refrigerator appliances and pantries, generally provide an enclosed chamber for receiving multiple items or objects. For example, refrigerator appliances generally include a cabinet that defines a chilled chamber. A user can place food items or objects within the chilled chamber in order to hinder perishing of such food items. Thereby, a useable life of perishable items or objects can be increased.

Over time, a large volume or number of stored items (e.g., food items) can accumulate within the refrigerator's chilled chamber. As stored items accumulate, users of the refrigerator appliance can have difficulty seeing or identifying the items located within the refrigerator appliance. Additionally, users can have difficulty determining a quantity of certain items within the refrigerator appliance. This is especially true when multiple users add/remove items from a common refrigerator appliance without communicating with other users. Consequently, the users may accidentally purchase excessive or undesired items. For example, certain food items do not readily perish within the chilled chamber, and such food items may be consumed infrequently. Thus, such food items can remain within the chilled chamber for extended periods of time. The users can forget about such food items and purchase replacements despite already having acceptable items. In such a manner, the users can be inconvenienced or expend money needlessly. Additionally or alternatively, some users may be unaware that certain items have been removed or consumed. Thus, users may fail to replace or replenish such items.

Certain existing appliances have attempted to address some of these concerns by mounting a camera within the chilled chamber to capture images of the chilled chamber. Nonetheless, such appliances may still have difficulties capturing a useful image, especially for items placed on lower shelf, items placed beneath other items, or in instances wherein another object is between the camera and a stored item.

Accordingly, a refrigerator appliance with features for assisting a user with capturing, viewing, or tracking contents of a chilled chamber of the refrigerator appliance would be useful. In particular, it would be advantageous to provide a refrigerator appliance with improved features for capturing images of items placed within or removed from a chilled chamber.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a refrigerator appliance is provided. The refrigerator appliance may include a cabinet, a door, a support shelf, and a camera module. The cabinet may define a chilled chamber. The door may be rotatably hinged to the cabinet to provide selective access to the chilled chamber. The support shelf may be mounted within the chilled chamber. The support shelf may extend along a transverse direction between a front edge proximal to the door and a rearward edge distal to the door. The camera module may be movably mounted to the cabinet above the support shelf. The camera module may be movable on the cabinet along a predefined direction between a retracted position proximal to a first end of the cabinet and an extended position proximal to a second end of the cabinet. The camera module may be directed at the chilled chamber in the extended position to capture an image thereof. The camera module may be disposed between the door and the front edge of the support shelf along the transverse direction in the extended position.

In another exemplary aspect of the present disclosure, a refrigerator appliance is provided. The refrigerator appliance may include a cabinet, a door, a camera carriage, a camera module, and a light source. The cabinet may define a chilled chamber. The door may be rotatably hinged to the cabinet to provide selective access to the chilled chamber. The camera carriage may be movably mounted to the cabinet. The camera carriage may be movable on the cabinet along a predefined direction between a retracted position proximal to a first end of the cabinet and an extended position proximal to a second end of the cabinet. The camera module may be supported on the camera carriage to move therewith between the retracted position and the extended position, the camera module being directed at the chilled chamber in the extended position to capture an image of the chilled chamber. The light source may be supported on the camera carriage to move therewith between the retracted position and the extended position. The light source may be directed at the chilled chamber in the extended position to illuminate the chilled chamber.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 6 provides a simplified section view of a camera assembly of a refrigerator appliance according to exemplary embodiments of the present disclosure, the camera assembly being in a retracted position.

FIG. 7 provides a simplified section view of the exemplary camera assembly of FIG. 6 in an extended position.

FIG. 8 provides a simplified section view of a camera assembly of a refrigerator appliance according to exemplary embodiments of the present disclosure.

FIG. 9 provides a simplified section view of a camera assembly of a refrigerator appliance according to exemplary embodiments of the present disclosure.

DETAILED DESCRIPTION

Figure 1:
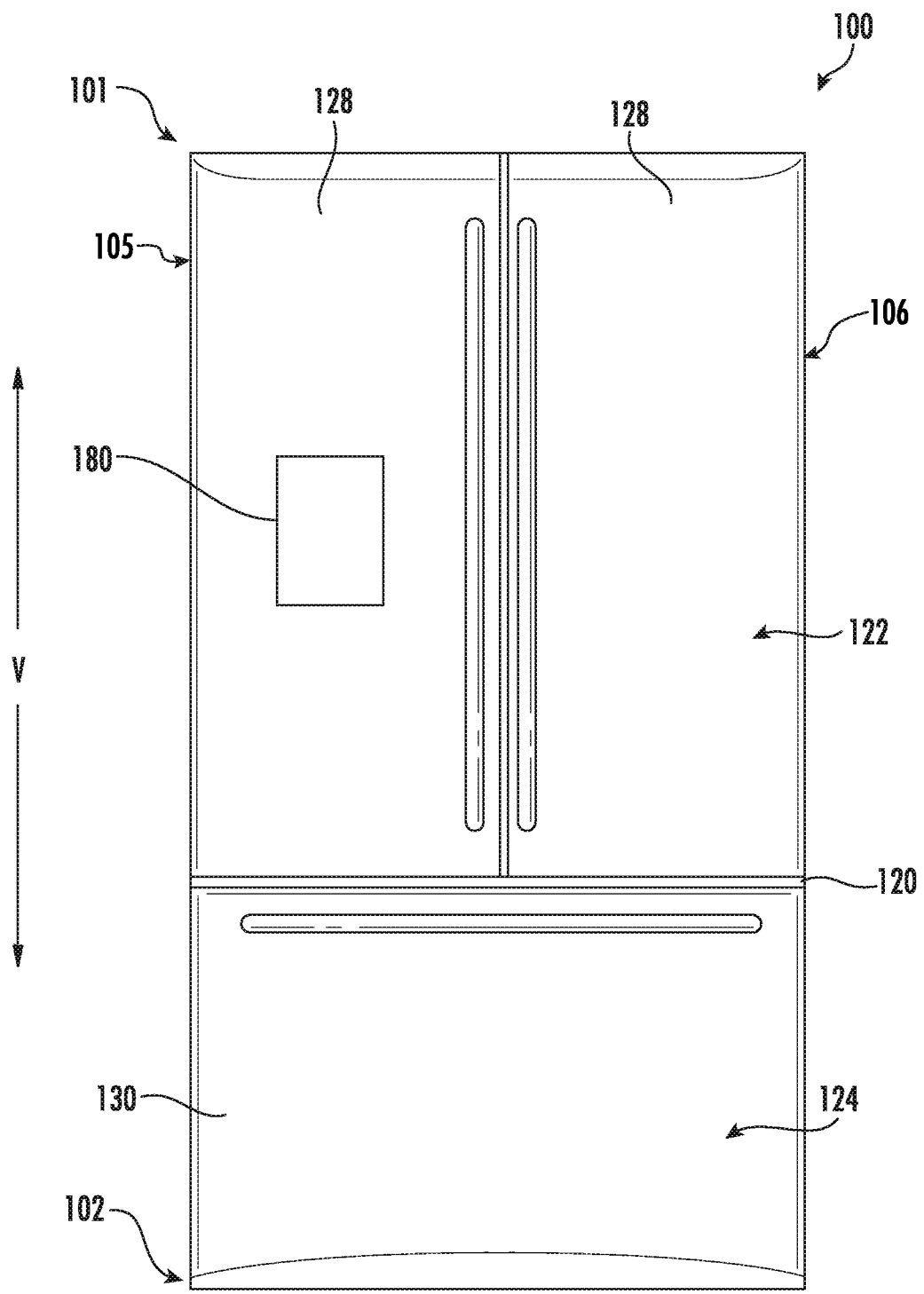
FIG. 1 provides a front elevation view of a refrigerator appliance according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

Figure 2:
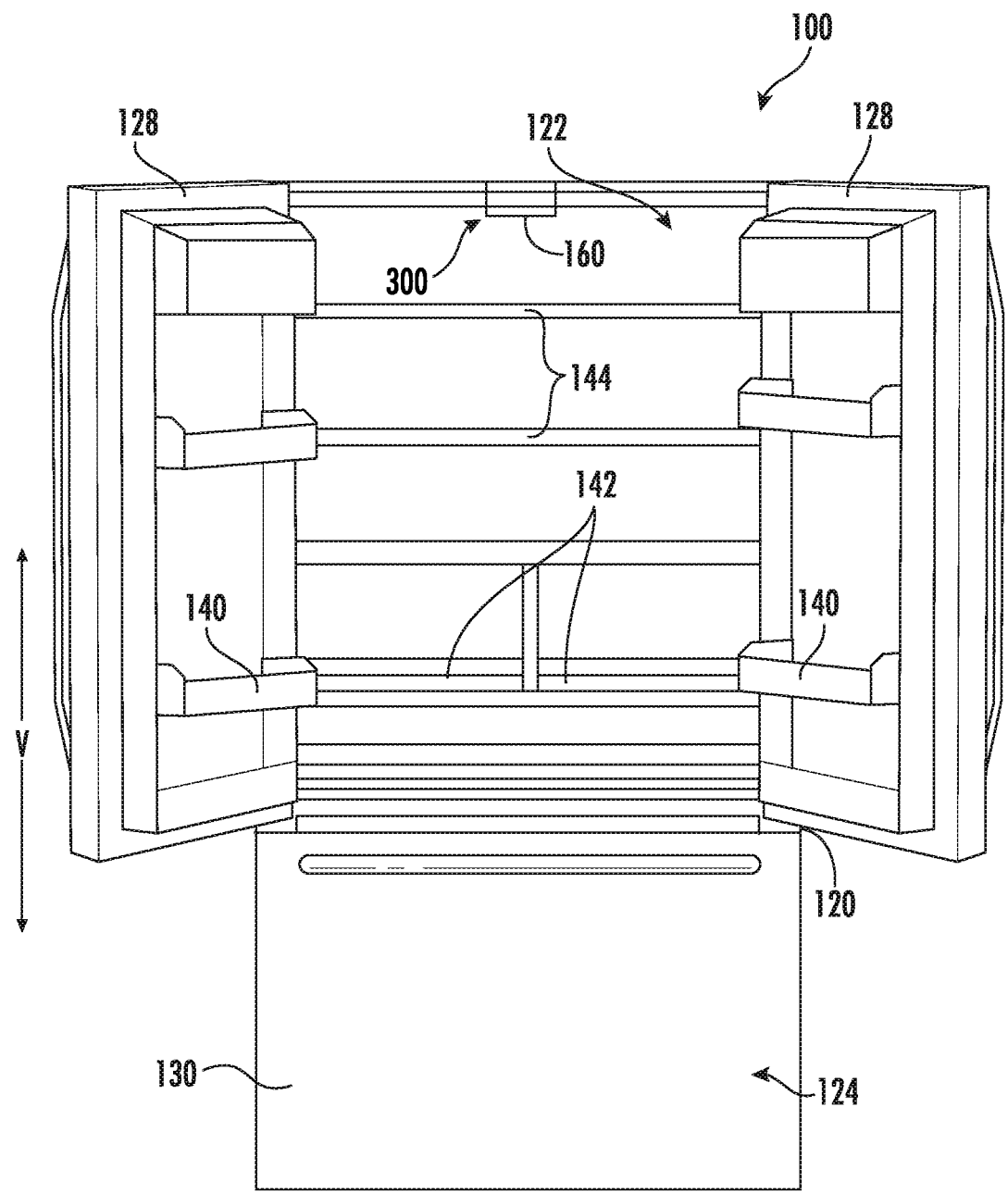
FIG. 2 provides a front elevation view of a refrigerator appliance according to exemplary embodiments of the present disclosure, wherein refrigerator doors are shown in an open position.

Turning now to the figures, FIG. 1 provides a front elevation view of a refrigerator appliance 100 according to exemplary embodiments of the present disclosure with refrigerator doors 128 of the refrigerator appliance 100 shown in a closed position. FIG. 2 provides a front view elevation of refrigerator appliance 100 with refrigerator doors 128 shown in an open position to reveal a fresh food chamber 122 of refrigerator appliance 100.

Refrigerator appliance 100 includes a housing or cabinet 120 that extends between a top 101 and a bottom 102 along a vertical direction V. Cabinet 120 also extends along a lateral direction L between a first lateral side 105 and a second lateral side 106, as well as along a transverse direction T between a front end 103 and a rear end 104. Each of the vertical direction V, lateral direction L, and transverse direction T are mutually perpendicular to one another to define an orthogonal directional system.

Cabinet 120 defines chilled chambers for receipt of food items for storage. In particular, cabinet 120 defines fresh food chamber 122 positioned at or adjacent top 101 of cabinet 120 and a freezer chamber 124 arranged at or adjacent bottom 102 of cabinet 120. As such, refrigerator appliance 100 is generally referred to as a bottom mount refrigerator. It is recognized, however, that the benefits of the present disclosure apply to other types and styles of refrigerator appliance, such as a top mount refrigerator appliance, a side-by-side style refrigerator appliance, etc. Consequently, the description set forth herein is for illustrative purposes only and is not intended to be limiting in any aspect to any particular storage enclosure or refrigerator chamber configuration, except as otherwise indicated.

Refrigerator doors 128 are rotatably hinged to an edge of housing 120 for selectively accessing fresh food chamber 122. In addition, a freezer door 130 is arranged below refrigerator doors 128 for selectively accessing freezer chamber 124. Freezer door 130 is coupled to a freezer drawer 142 (not shown) slidably mounted within freezer chamber 124. As discussed above, refrigerator doors 128 and freezer door 130 are shown in the closed configuration in FIG. 1, and refrigerator doors 128 are shown in the open position in FIG. 2.

In the exemplary embodiments of FIGS. 1 and 2, the refrigerator doors 128 are provided in a French door 128 arrangement. Thus, doors 128 may include a pair of independently movable doors 128 (i.e., door 128 segments) pivoted at opposite lateral sides of the cabinet 120. In other words, a first door 128 is pivotably mounted to first lateral side 105 while a second door 128 is pivotably mounted to second lateral side 106 to move or pivot independently from the first door 128.

Turning now to FIG. 2, various storage components are mounted within fresh food chamber 122 to facilitate storage of food items therein as will be understood by those skilled in the art. In particular, the storage components include bins 140, drawers 142, and shelves 144 that are mounted within fresh food chamber 122. Bins 140, drawers 142, and shelves 144 are configured for receipt of stored items (e.g., beverages or solid food items) and may assist with organizing such food items. As an example, drawers 142 can receive fresh food items (e.g., vegetables, fruits, or cheeses) and increase the useful life of such fresh food items.

Refrigerator appliance 100 also includes features for assisting a user with identifying food items positioned within fresh food chamber 122 or freezer chamber 124. The user can utilize such features, for example, to view food items stored within fresh food chamber 122 or freezer chamber 124 or create an inventory of such food items. Such features are discussed in greater detail below.

Figure 3:
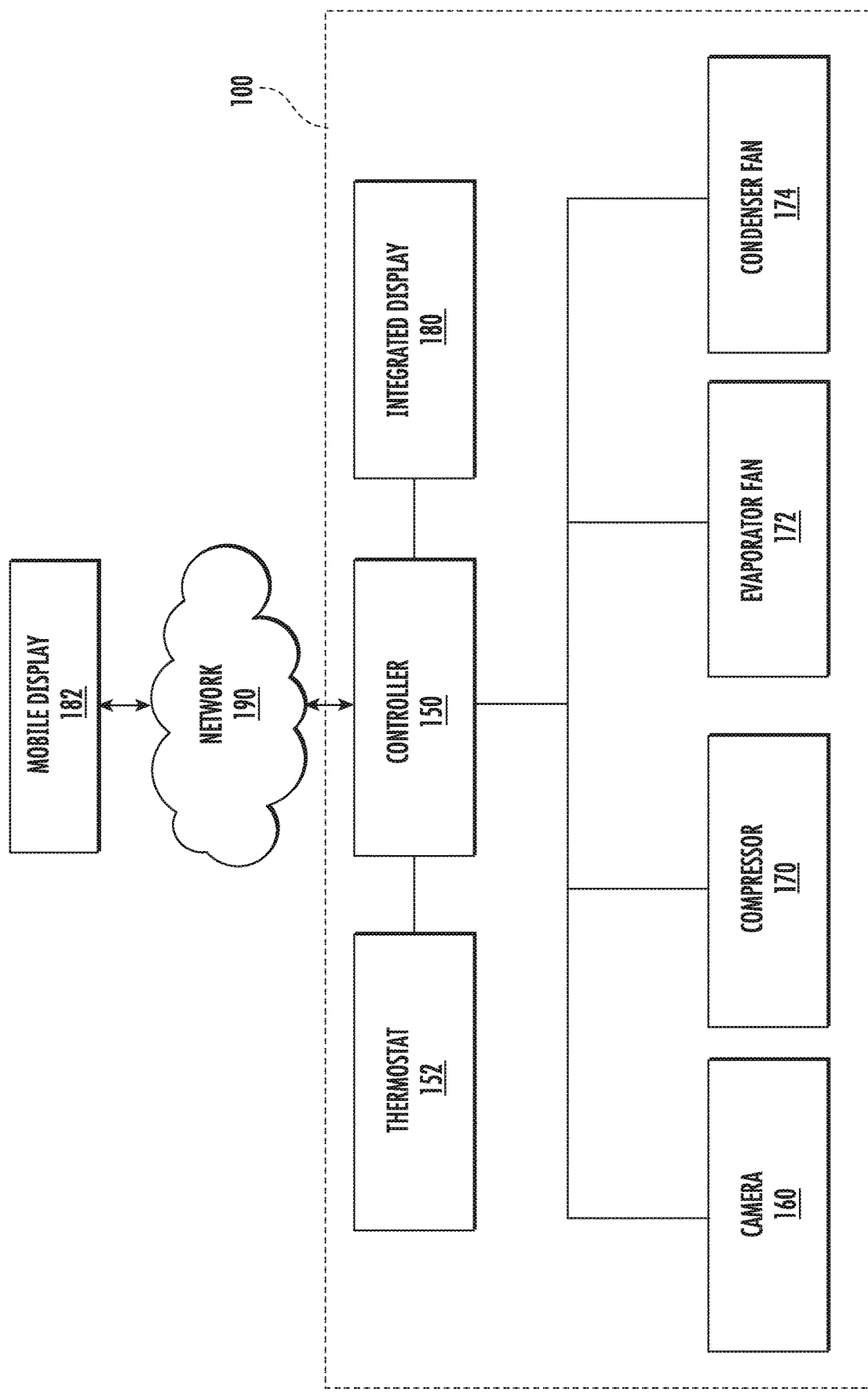
FIG. 3 provides a schematic view of a refrigerator appliance according to exemplary embodiments of the present disclosure.

FIG. 3 provides a schematic view of refrigerator appliance 100. Refrigerator appliance 100 includes a controller 150 that is operatively coupled or in communication with components of a refrigeration system (not shown) of refrigerator appliance 100 configured for cooling fresh food chamber 122 or freezer chamber 124. The components include a compressor 170, an evaporator fan 172, and a condenser fan 174. Controller 150 can selectively operate such components in order to cool fresh food chamber 122 or freezer chamber 124. Controller 150 is also in communication with a thermostat (e.g., a thermocouple or thermistor). The thermostat may be positioned in fresh food compartment 122 or freezer compartment 124 (FIG. 2). Controller 150 may receive a signal from the thermostat that corresponds to a temperature of fresh food compartment 122 or freezer compartment 124. Controller 150 may also include an internal timer for calculating elapsed time periods.

Controller 150 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In some embodiments, the processor executes non-transitory programming instructions stored in memory. For certain embodiments, the instructions include a software package configured to operate appliance 100 or execute an operation routine (e.g., the exemplary methods 1300, 1400, and 1500 described below with reference to FIGS. 13 through 15). The memory may be a separate component from the processor or may be included onboard within the processor. Alternatively, controller 150 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

Controller 150 may be positioned in a variety of locations throughout refrigerator appliance 100. Input/output ("I/O") signals may be routed between controller 150 and various operational components of refrigerator appliance 100. One or more components of refrigerator appliance 100 may be in operative communication (e.g., electric communication) with controller 150 via one or more conductive signal lines or shared communication busses. Additionally or alternatively, one or more components of refrigerator appliance 100 may be in operative communication (e.g., wireless communication) with controller 150 via one or more wireless signal bands.

Refrigerator appliance 100 also includes a camera or camera module 160. Camera 160 may be any type of device suitable for capturing a two-dimensional picture or image, such as image illustrated in FIG. 4. As an example, camera 160 may be a video camera or a digital camera with an electronic image sensor [e.g., a charge coupled device (CCD) or a CMOS sensor]. When assembled, camera 160 is in communication (e.g., electric or wireless communication) with controller 150 such that controller 150 may receive a signal from camera 160 corresponding to the image captured by camera 160.

As will be described in detail below, camera 160 is mounted to refrigerator appliance 100 and can be directed toward one or more chilled chamber (e.g., fresh food chamber 122—FIG. 2). In some embodiments, camera 160 is included with a camera assembly 300 mounted within fresh food chamber 122 at a top portion thereof (e.g., adjacent top 101). For instance, camera assembly 300 be fixed to or directed through a top wall of an internal liner defining fresh food chamber 122. In such embodiments, camera 160 may be generally directed downward, as illustrated in FIG. 2. During use, camera 160 may be directed towards at least a portion of any particular one of or combination of drawers 142 and shelves 144 (FIG. 2). Thus, camera 160 can capture images of one of drawers 142, all of drawers 142, one of shelves 144, all of shelves 144, or any suitable combination thereof.

In certain embodiments, refrigerator appliance 100 includes an integrated display 180. Integrated display 180 may be mounted on refrigerator door 128 (FIG. 1) or at any other suitable location on refrigerator appliance 100. Integrated display 180 is in operative communication with controller 150 such that integrated display 180 may receive a signal from controller 150 corresponding to an image captured by camera 160. Integrated display 180 can receive such signal from controller 150 and present the image to a user visually. Integrated display 180 may include, for example, a liquid crystal display panel (LCD), a plasma display panel (PDP), or any other suitable mechanism for displaying an image (e.g., a projector).

In additional or alternative embodiments, refrigerator appliance 100 includes a network interface (not shown) that couples refrigerator appliance 100 (e.g., controller 150) to a network 190 such that refrigerator appliance 100 can transmit and receive information over network 190. Network 190 can be any wired or wireless network such as a WAN, LAN, or HAN.

In some such embodiments, refrigerator appliance 100 (e.g., controller 150) is in communication with a mobile display 182 via network 190. Mobile display 182 can be any device configured to communicate over network 190 and display images received therefrom. For example, mobile display 182 may be a computer, a smartphone, or a tablet. Mobile display 182 is in communication with controller 150 such that mobile display 182 may receive a signal from controller 150 (via network 190) corresponding to a user interface or an image captured by camera 160. Mobile display 182 can receive such signal from controller 150 and present one or more images to a user visually. Mobile display 182 may include, for example, a liquid crystal display panel (LCD), a plasma display panel (PDP), or any other suitable mechanism for displaying an image (e.g., a projector). Mobile display 182 can also include an interface (e.g., tactile inputs, such as buttons, or a graphical user interface) that allows mobile display 182 to initiate communications with refrigerator appliance 100 over network 190.

During use, such as during an image capture sequence, camera 160 may capture one or more two-dimensional images (e.g., as a video feed or series of sequential static images) that may be transmitted to the controller 150 (e.g., as a data signal), as is generally understood. From the captured images, items (e.g., stored items, such as food, or non-stored items such as a user appendage, a shelf, a movable drawer, etc.) within the field of view for the camera 160 may be automatically identified by the controller 150. As is understood, recognizing or identifying such items, may be performed by edge matching, divide-and-conquer search, greyscale matching, histograms of receptive field responses, or another suitable routine (e.g., executed at the controller 150 based on one or more captured images from camera 160).

Figure 4:
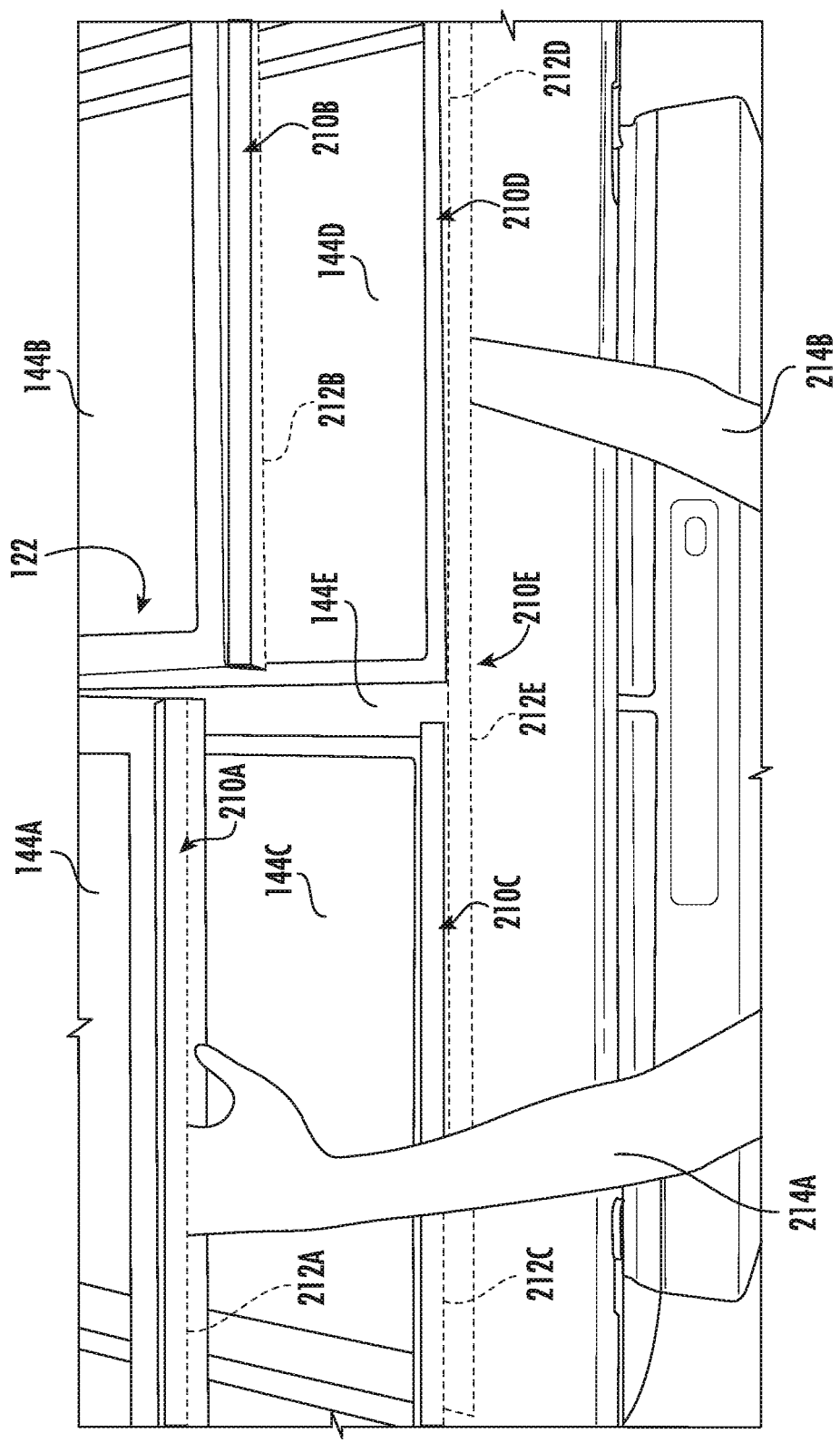
FIG. 4 illustrates an exemplary two-dimensional image of shelves within a fresh food chamber of a refrigerator appliance captured at a camera assembly of the refrigerator appliance according to exemplary embodiments of the present disclosure.

As an example, FIG. 4 illustrates an exemplary two-dimensional image such as might be captured at camera 160 as part of an image capture sequence. In other words, FIG. 4 illustrates a possible field of view for camera 160 directed toward a chilled chamber. As additional or alternative examples, FIGS. 5 and 6 both illustrate a separate series of exemplary two-dimensional images that might be viewed at display 180 or 182 after being isolated or generated from an initial image captured at camera 160 as part of an image capture sequence.

In certain embodiments, camera 160 and controller 150 are configured to capture multiple, sequential, two-dimensional images (e.g., at a predetermined rate or pattern) as part of an image capture sequence. Sequential images (e.g., a previously-captured image and a more-recently-captured image) may be recorded (e.g., temporarily) and compared at the controller 150. From the comparison, changes or differences between sequential images may be detected. In some embodiments, the image capture sequence is prompted or initiated in response to detected movement within a chilled chamber (e.g., fresh food chamber 122). The image capture sequence may subsequently be stopped or halted according to one or more end conditions, such as expiration of a predetermined time period, failure to detect further changes in sequential images, or closing of the door 128.

As an example, and as shown in FIG. 4, at least a portion of multiple support shelves 144A, 144B, 144C, 144D, 144E may be visible within the field of view for camera 160 (FIG. 2), such as when camera 160 is an extended position. For instance, front edges 210A, 210B, 210C, 210D, 210E of the shelves 144A, 144B, 144C, 144D, 144E may be within the field of view for camera 160 (FIG. 2). Each front edge 210A, 210B, 210C, 210D, 210E may represent the forwardmost surface of a corresponding shelf 144A, 144B, 144C, 144D, 144E, which may be the shelf's surface most proximal to the opening of fresh food chamber 122. In the illustrated example of FIG. 4, front edge 210A corresponds to shelf 144A, front edge 210B corresponds to shelf 144B, front edge 210C corresponds to shelf 144C, front edge 210D corresponds to shelf 144D, and front edge 210E corresponds to shelf 144E. In some embodiments, one or more of the shelves 144A, 144B, 144C, 144D, 144E are provided at different heights (i.e., relative vertical positions within fresh food chamber 122). Optionally, the front edges 210A, 210B, 210C, 210D, 210E of shelves 144A, 144B, 144C, 144D, 144E, which are at discrete heights within fresh food chamber 122, may be within the field of view for camera 160.

In certain embodiments, controller 150 is configured to identify a fiducial marker or region of one or more of the shelves 144A, 144B, 144C, 144D, 144E based on signals or images received from the camera 160 (e.g., during an image capture sequence). For instance, from the two-dimensional images captured from the camera 160, the controller 150 may identify a fiducial edge 212A, 212B, 212C, 212D, 212E of one or more of the shelves 144A, 144B, 144C, 144D, 144E. Optionally, a corresponding fiducial edge 212A, 212B, 212C, 212D, 212E may be identified for each shelf 144A, 144B, 144C, 144D, 144E. Together, the fiducial edges 212A, 212B, 212C, 212D, 212E may establish a vertical coordinate system within fresh food chamber 122. Using this vertical coordinate system, controller 150 may be able to determine what shelf 4A, 144B, 144C, 144D, 144E or between which vertically-adjacent shelves 144 (e.g., 144A and 144C), an item or a user appendage 214A, 214B (e.g., hand, arm, etc.). As an example, in the illustrated image of FIG. 4, a user's left arm 214A is shown to cross the fiducial edge 212C without crossing the higher fiducial edge 212A. Thus, it may be determined that the user's left arm 214A is passing between shelf 144A and shelf 144C. As an additional example, in the illustrated image of FIG. 4, a user's right arm 214B is shown to cross the fiducial edge 212E without crossing the higher fiducial edges 212D and 212B. Thus, it may be determined that the user's right arm 214B is passing between shelf 144D and shelf 144E.

Turning now generally to FIGS. 5 through 16, a camera assembly 300 including a camera module 310 mounted to refrigerator appliance 100 (FIGS. 1 and 2) is described in detail. Camera module 310 may include or be included with camera 160 (e.g., provided with camera assembly 300, as described above). Moreover, at least a portion of camera assembly 300, including camera module 310, may be movable (e.g., along a predefined direction) between a discrete retracted position and extended position while remaining attached to a portion of cabinet 120. In turn, camera module 310 may be proximal to a first end of the cabinet 120 (and, thus, distal to a second end of the cabinet 120) in the retracted position, while being distal to the first end of the cabinet 120 (and, thus, proximal to the second end of the cabinet 120) in the extended position. Moreover, in the extended position, camera module 310 is directed at the chilled chamber (e.g., fresh food chamber 122) to capture one or more images, as described above. Optionally, camera module 310 may capture images as it moves between the retracted and extended positions, advantageously capturing an increased area or field of view (e.g., in comparison to a stationary camera).

Figure 5:
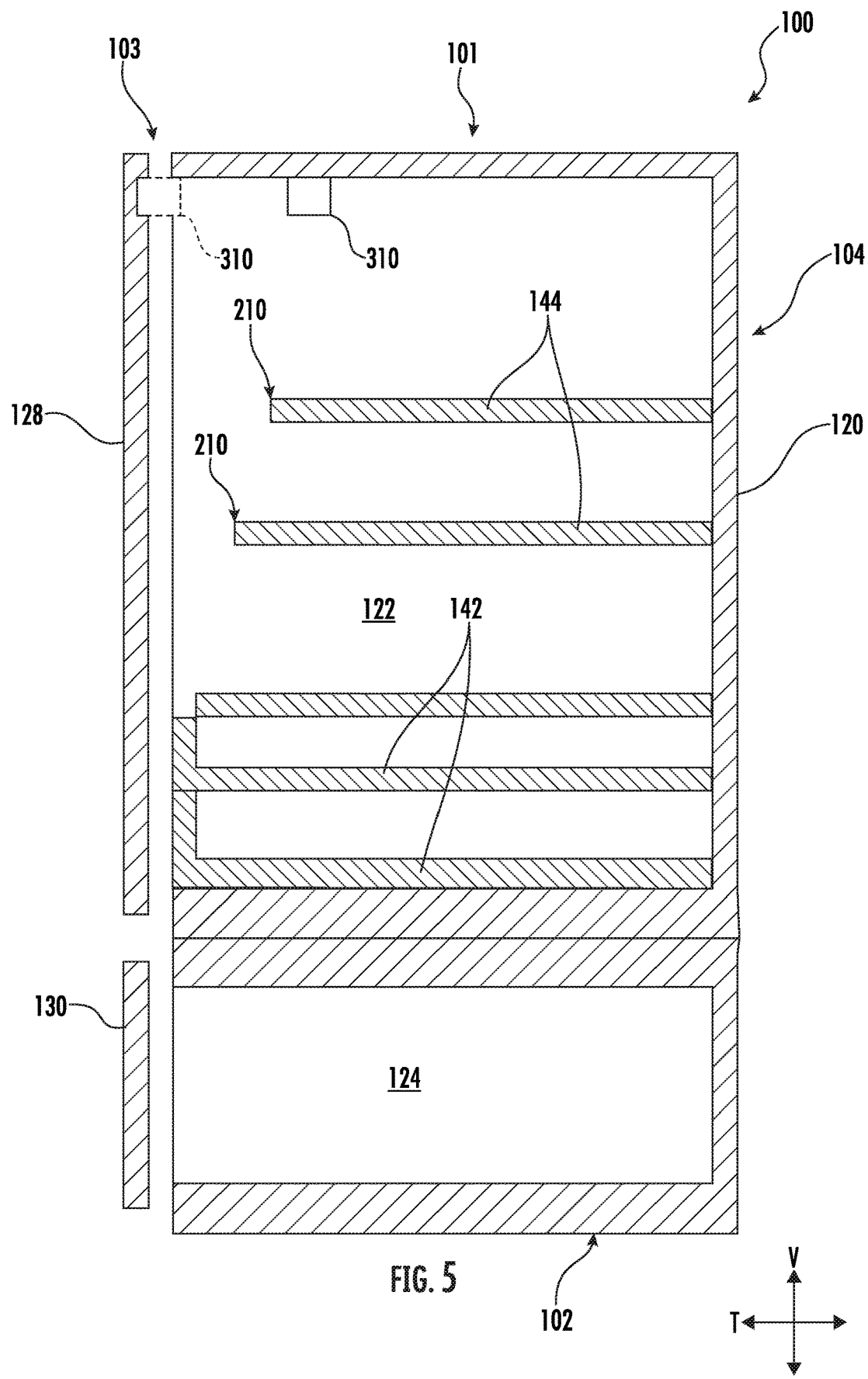
FIG. 5 provides a simplified, cross-sectional, elevation view of a refrigerator appliance according to exemplary embodiments of the present disclosure.

Turning especially to FIGS. 5 through 7, in some embodiments, a portion of camera assembly 300 that includes camera module 310 is movable along the transverse direction T (e.g., as motivated by a mechanical drive assembly 318). In other words, the predefined direction of movement may include or be provided as the transverse direction T. Movement from the retracted position (e.g., FIG. 6) to the extended position (e.g., FIG. 7) may bring the camera module 310 closer to a user in front of cabinet 120. The extended position may thus include the camera module 310 proximal to the front end 103 (e.g., second end) while the retracted position includes the camera module 310 proximal to the rear end 104 (e.g., first end).

In certain embodiments, camera module 310 is supported on a camera carriage 312 that is movably mounted to cabinet 120 as part of camera assembly 300. Camera carriage 312 may be anchored or otherwise joined to cabinet 120 (e.g., at a portion of the internal liner defining fresh food chamber 122) via an assembly bracket 314 to move between the retracted position and the extended position. Assembly bracket 314 may be fixed relative to cabinet 120 (e.g., on or more suitable adhesives, mechanical fasteners, etc.), as would be understood. When assembled, however, camera module 310 may be fixed relative to camera carriage 312 and thus is movable along the transverse direction T in tandem with camera carriage 312.

In optional embodiments, one or more other features may be supported on camera carriage 312 beside camera module 310. For instance, a light source 316 may be supported on camera carriage 312 to move between the retracted position and the extended position. In some such embodiments, light source 316 is horizontally (e.g., laterally or transversely) spaced apart from camera module 310. Generally, light source 316 may be provided as any suitable (e.g., electrically powered) light emitter, such as an incandescent bulb, halogen bulb, fluorescent bulb, light emitting diode (LED), etc. When activated (e.g., in the extended position), light source 316 may illuminate at least a portion of the chilled chamber (e.g., fresh food chamber 122). In some embodiments, light source 316 is directed at the chilled chamber in the extended position. For instance, the extended position may include light source 316 directed to the chilled chamber to illuminate the same. Advantageously, light source 316 may be generally directed at the same region as camera module 310 and, thus, provide illumination to improve the accuracy or quality of images captured at camera module 310. In optional embodiments, light source 316 provides the primary illumination for the chilled chamber (e.g., in place of or in tandem with a separate stationary source of light mounted within the chilled chamber).

Generally, camera assembly 300; including camera module 310, camera carriage 312, or assembly bracket 314; may be disposed at any suitable location on cabinet 120 to capture image(s) of the chilled chamber (e.g., fresh food chamber 122) in the extended position. In exemplary embodiments, camera assembly 300 is mounted at a top portion of cabinet 120 within the chilled chamber. For instance, camera assembly 300 may be joined to a top wall of the internal liner (e.g., at the assembly bracket 314 at top 101).

In certain embodiments, camera assembly 300 is mounted such that camera module 310 can move in front of a front edge 210 (e.g., fiducial edge) of one or more support shelves 144 mounted within the chilled chamber (e.g., fresh food chamber 122). In other words, relative to the transverse direction T, camera module 310 in the extended position may be forward from the front edge(s) 210 of one or more shelves 144. For instance, camera module 310 may be disposed between a front edge 210 and the opening to fresh food chamber 122 or doors 128 in the extended position. Additionally or alternatively, camera module 310 may be disposed forward from the opening in the extended position. The one or more shelves 144 may include the shelf 144 closest to camera assembly 300 relative to the vertical direction V (e.g., the uppermost shelf) or two or more shelves 144 (e.g., above the drawers 142). Advantageously, the extended position may hold camera module 310 at a location where a significant portion of the lower shelves 144 or drawers 142 is visible). Optionally, the retracted position may provide the camera module 310 rearward of the front edge 210 one or more shelves 144 (e.g., between a front edge 210 and rear end 104 along the transverse direction T).

Figure 10:
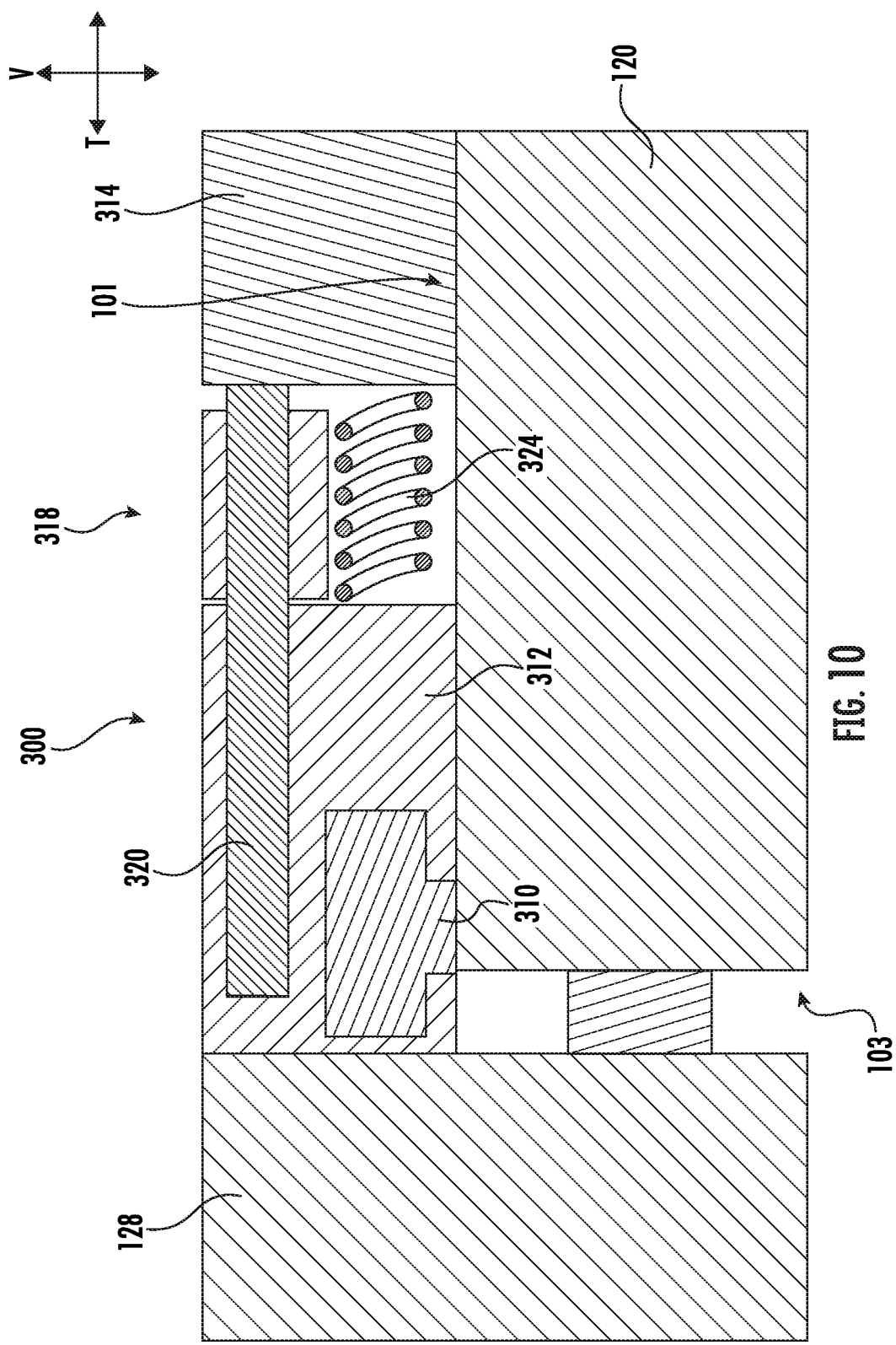
FIG. 10 provides a simplified section view of a camera assembly of a refrigerator appliance according to exemplary embodiments of the present disclosure.

Turning briefly to FIG. 10, although some embodiments may provide camera assembly 300, and camera module 310 in particular, within the chilled chamber (e.g., fresh food chamber 122), other embodiments may provide camera module 310 outside of the corresponding chilled chamber (e.g., fresh food chamber 122). Specifically, camera module 310 may be held apart from the chilled chamber in the extended position and the retracted position. For instance, camera carriage 312 may be mounted above the chilled chamber (e.g., to a portion of cabinet 120 apart from internal liner, such as an outer panel) to extend in front of the opening to the chilled chamber in the extended position.

Returning generally to FIGS. 5 through 7 and 10, camera assembly 300 may include drive assembly 318 configured to motivate or bias camera carriage 312 to the extended position. In the illustrated embodiments, drive assembly 318 includes a guide rail 320 and prong 322 in mechanical communication with camera carriage 312. As shown, prong 322 may extend from (e.g., separably or integrally) from camera carriage 312 and be selectively engaged with an inner surface of door 128 to force camera carriage 312 rearward (e.g., as door 128 closes) and hold camera carriage 312 in the retracted position while door 128 is in the closed position. Optionally, a spring 324 (e.g., coil spring, leaf spring, pneumatic spring cylinder, etc.) may be provided in further mechanical communication with camera carriage 312. Specifically, spring 324 may be in biased engagement with the camera carriage 312 (including camera module 310), biasing the camera module 310 to the extended position.

As illustrated, the position of camera carriage 312 may be based on or correspond to the position of at least one door 128. For instance, the retracted position may correspond to the closed position of a matched door 128 while the extended position may correspond to the open position (or an at least partially opened or non-closed position) of the matched door 128.

It is noted that although a linear guide rail 320 and prong 322 are illustrated, another suitable, mechanically-driven system (e.g., gear train) may be provided to motivate camera carriage 312 between the extended and retracted positions based on the position of a matched door 128.

Figure 15:
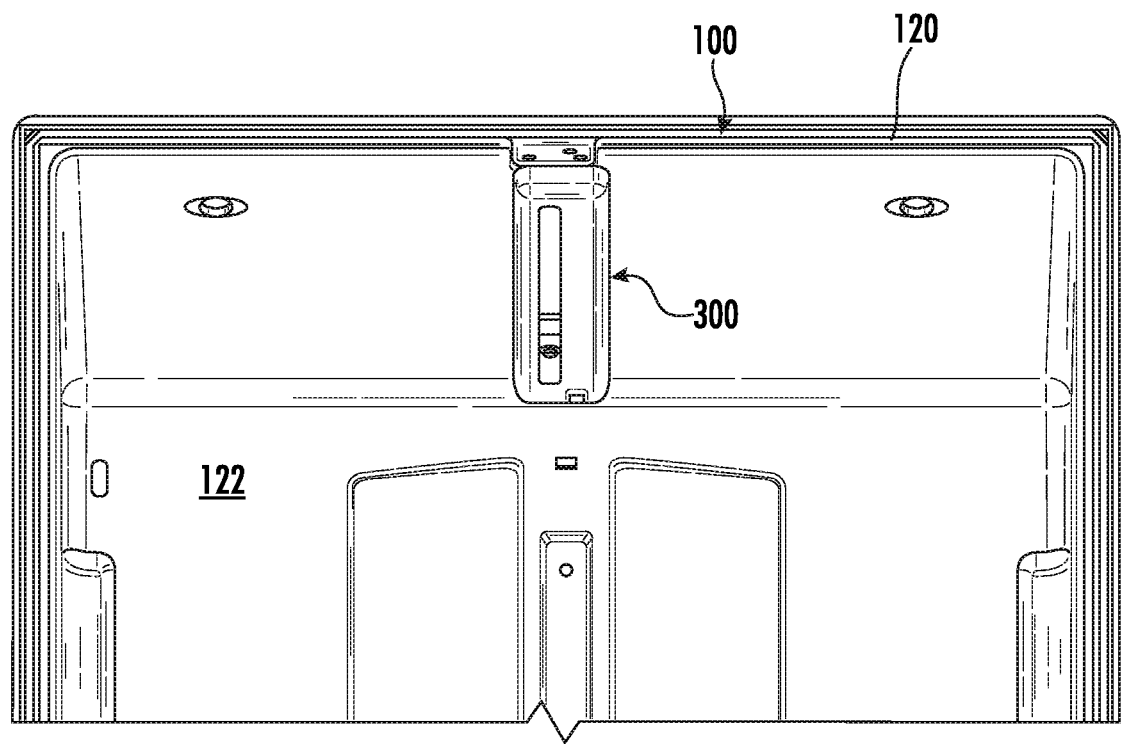
FIG. 15 provides a perspective view of a top portion of a chilled chamber and camera assembly of a refrigerator appliance according to exemplary embodiments of the present disclosure.
Figure 16:
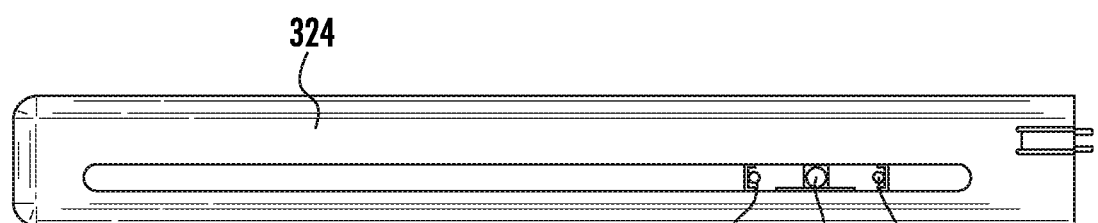
FIG. 16 provides a perspective view of a portion of the exemplary camera assembly of FIG. 15.

Turning now to FIGS. 5 and 8, as well as FIGS. 15 and 16, in some embodiments, a portion of camera assembly 300 that includes camera module 310 is movable along the transverse direction T (e.g., as motivated by an electronic drive assembly 318). In other words, the predefined direction of movement may include or be provided as the transverse direction T. Movement from the retracted position to the extended position may bring the camera module 310 closer to a user in front of cabinet 120. The extended position may thus include the camera module 310 proximal to the front end 103 (e.g., second end) while the retracted position includes the camera module 310 proximal to the rear end 104 (e.g., first end).

In certain embodiments, camera module 310 is supported on a camera carriage 312 that is movably mounted to cabinet 120 as part of camera assembly 300. Camera carriage 312 may be anchored or otherwise joined to cabinet 120 (e.g., at a portion of the internal liner defining the chilled chamber) via an assembly bracket 314 to move between the retracted position and the extended position. Assembly bracket 314 may be fixed relative to cabinet 120 (e.g., on or more suitable adhesives, mechanical fasteners, etc.), as would be understood. When assembled, however, camera module 310 may be fixed relative to camera carriage 312 and thus is movable along the transverse direction T in tandem with camera carriage 312.

In optional embodiments, one or more other features may be supported on camera carriage 312 beside camera module 310. For instance, a light source 316 may be supported on camera carriage 312 to move between the retracted position and the extended position. In some such embodiments, light source 316 is horizontally (e.g., laterally or transversely) spaced apart from camera module 310. Generally, light source 316 may be provided as any suitable (e.g., electrically powered) light emitter, such as an incandescent bulb, halogen bulb, fluorescent bulb, light emitting diode (LED), etc. When activated (e.g., in the extended position), light source 316 may illuminate at least a portion of the chilled chamber. In some embodiments, light source 316 is directed at the chilled chamber in the extended position. For instance, the extended position may include light source 316 directed to chilled chamber to illuminate the same. Advantageously, light source 316 may be generally directed at the same region as camera module 310 and, thus, provide illumination to improve the accuracy or quality of images captured at camera module 310. In optional embodiments, light source 316 provides the primary illumination for chilled chamber (e.g., in place of or in tandem with a separate stationary source of light mounted within the chilled chamber).

Generally, camera assembly 300; including camera module 310, camera carriage 312, or assembly bracket 314; may be disposed at any suitable location on cabinet 120 to capture image(s) of the chilled chamber in the extended position. In exemplary embodiments, camera assembly 300 is mounted at a top portion of cabinet 120 within the chilled chamber. For instance, camera assembly 300 may be joined to a top wall of the internal liner (e.g., at the assembly bracket 314 at top 101).

In certain embodiments, camera assembly 300 is mounted such that camera module 310 can move in front of a front edge 210 (e.g., fiducial edge) of one or more shelves 144 mounted within the chilled chamber. In other words, relative to the transverse direction T, camera module 310 in the extended position may be forward from the front edge(s) 210 of one or more shelves 144. For instance, camera module 310 may be disposed between a front edge 210 and the opening or door 128 in the extended position. Additionally or alternatively, camera module 310 may be disposed forward from the opening in the extended position. The one or more shelves 144 may include the shelf 144 closest to camera assembly 300 relative to the vertical direction V (e.g., the uppermost shelf) or two or more shelves 144 (e.g., above the drawers 142). Advantageously, the extended position may hold camera module 310 at a location where a significant portion of the lower shelves 144 or drawers 142 is visible). Optionally, the retracted position may provide the camera module 310 rearward of the front edge 210 one or more shelves 144 (e.g., between a front edge 210 and rear end 104 along the transverse direction T).

As shown, an electronic drive assembly 318 may be configured to motivate or direct camera carriage 312 to the extended position or retracted position. Generally, electronic drive assembly 318 includes an electronic drive motor 326 in mechanical communication with camera carriage 312. Electronic drive motor 326 may thus direct camera module 310 between the extended and retracted positions. Moreover, electronic drive motor 326 may be operably coupled to controller 150 (FIG. 3) (e.g., to transmit/receive signals therebetween). During use, electronic drive assembly 318 may receive one or more signals (e.g., from controller 150) based on the position of one or more of the doors 128. For instance, controller 150 may be operably coupled to one or more sensors (e.g., a proximity sensor, position sensor, etc.) configured to detect a position of one or more door 128, such as when a door 128 is in the closed position, as is generally understood. Based on a detected position of one or more doors 128, controller 150 may transmit a signal to electronic drive motor 326 to direct camera carriage 312 to the extend position or retracted position. The position of camera carriage 312 may be based on or correspond to the position of at least one door 128. For instance, the retracted position may correspond to the closed position of a matched door 128 while the extended position may correspond to the open position (or an at least partially opened or non-closed position) of the matched door 128. Thus, electronic drive motor 326 may be configured to motivate the camera module 310 between the retracted position and the extended position based on a received input signal, such as an input signal received from a sensor configured to detect the position of one or more of the doors 128.

It is noted that although a linear rack and pinion are illustrated, another suitable, electrically-driven system (e.g., gear train) coupled to electronic drive motor 326 may be provided to motivate camera carriage 312 between the extended and retracted positions based on the position of a matched door 128 (e.g., as indicated by a signal received at electronic drive motor 326 via controller 150).

Turning now especially to FIG. 9, in some embodiments, a portion of camera assembly 300 that includes camera module 310 is movable along the lateral direction L (e.g., as motivated by an electronic drive assembly 318). In other words, the predefined direction of movement may include or be provided as the lateral direction L. Movement from the retracted position to the extended position may bring the camera module 310 closer to one lateral side of cabinet 120 within the chilled chamber. For example, the extended position may include the camera module 310 proximal to the first lateral side 105 (e.g., second end) while the retracted position includes the camera module 310 proximal to the second lateral side 106 (e.g., first end).

In certain embodiments, camera module 310 is supported on a camera carriage 312 that is movably mounted to cabinet 120 as part of camera assembly 300. Camera carriage 312 may be anchored or otherwise joined to cabinet 120 (e.g., at a portion of the internal liner defining chilled chamber) via an assembly bracket 314 to move between the retracted position and the extended position. Assembly bracket 314 may be fixed relative to cabinet 120 (e.g., on or more suitable adhesives, mechanical fasteners, etc.), as would be understood. When assembled, however, camera module 310 may be fixed relative to camera carriage 312 and thus is movable along the lateral direction L in tandem with camera carriage 312.

In optional embodiments, one or more other features may be supported on camera carriage 312 beside camera module 310. For instance, a light source 316 may be supported on camera carriage 312 to move between the retracted position and the extended position. In some such embodiments, light source 316 is horizontally (e.g., laterally or transversely) spaced apart from camera module 310. Generally, light source 316 may be provided as any suitable (e.g., electrically powered) light emitter, such as an incandescent bulb, halogen bulb, fluorescent bulb, light emitting diode (LED), etc. When activated (e.g., in the extended position), light source 316 may illuminate at least a portion of the chilled chamber. In some embodiments, light source 316 is directed at the chilled chamber in the extended position. For instance, the extended position may include light source 316 directed to chilled chamber to illuminate the same. Advantageously, light source 316 may be generally directed at the same region as camera module 310 and, thus, provide illumination to improve the accuracy or quality of images captured at camera module 310. In optional embodiments, light source 316 provides the primary illumination for chilled chamber (e.g., in place of or in tandem with a separate stationary source of light mounted within the chilled chamber).

Generally, camera assembly 300; including camera module 310, camera carriage 312, or assembly bracket 314; may be disposed at any suitable location on cabinet 120 to capture image(s) of the chilled chamber in the extended position. In exemplary embodiments, camera assembly 300 is mounted at a top portion of cabinet 120 within the chilled chamber. For instance, camera assembly 300 may be joined to a top wall of the internal liner (e.g., at the assembly bracket 314 at top 101).

In certain embodiments, camera assembly 300 is mounted such that camera module 310 is maintained or held front of a front edge 210 (e.g., fiducial edge) of one or more shelves 144 mounted within the chilled chamber. In other words, relative to the transverse direction T, camera module 310 in both the extended position and the retracted position may be forward from the front edge(s) 210 of one or more shelves 144. For instance, camera module 310 may be disposed between a front edge 210 and the opening or door 128 in the extended position. The one or more shelves 144 may include the shelf 144 closest to camera assembly 300 relative to the vertical direction V (e.g., the uppermost shelf) or two or more shelves 144 (e.g., above the drawers 142). Advantageously, camera module 310 may be disposed at a location where a significant portion of the lower shelves 144 or drawers 142 is visible).

As shown, an electronic drive assembly 318 may be configured to motivate or direct camera carriage 312 to the extended position or retracted position. Generally, electronic drive assembly 318 includes an electronic drive motor 326 in mechanical communication with camera carriage 312. Electronic drive motor 326 may thus direct camera module 310 between the extended and retracted positions. Moreover, electronic drive motor 326 may be operably coupled to controller 150 (FIG. 1) (e.g., to transmit/receive signals therebetween). During use, electronic drive assembly 318 may receive one or more signals (e.g., from controller 150) based on the position of one or more of the doors 128. For instance, controller 150 may be operably coupled to one or more sensors (e.g., a proximity sensor, position sensor, etc.) configured to detect a position of one or more door 128, such as when a door 128 is in the closed position, as is generally understood. Based on a detected position of one or more doors 128, controller 150 may transmit a signal to electronic drive motor 326 to direct camera carriage 312 to the extend position or retracted position.

As an example, electronic drive motor 326 may direct or move camera carriage 312 to the side of an open door 128. In response to an open-door signal received from a sensor configured to detect the position of a door 128 pivotably mounted at first lateral side 105, electronic drive motor 326 may direct camera carriage 312 to the carriage position proximal to first lateral side 105 (e.g., the extended position). Similarly, in response to an open-door signal received from a sensor configured to detect the position of a door 128 pivotably mounted at second lateral side 106, electronic drive motor 326 may direct camera carriage 312 to the carriage position proximal to second lateral side 106 (e.g., the retracted position). Optionally, electronic drive motor 326 may direct the camera carriage 312 to an intermediate position between the extended and retracted positions in response to receiving open door 128 signals from both a sensor configured to detect the position of a door 128 pivotably mounted at first lateral side 105 and a sensor configured to detect the position of a door 128 pivotably mounted at second lateral side 106. In turn, opening both doors 128 may cause camera carriage 312 to be directed to the intermediate position.

Thus, electronic drive motor 326 may be configured to motivate the camera module 310 between the retracted position and the extended position based on an input signal corresponding to a pivoted position of the pair of independently movable doors 128. The position of camera carriage 312 may be based on or correspond to the position of at least the doors 128. For instance, the retracted position may correspond to the open position (or an at least partially opened or non-closed position) of one door 128 of the pair while the extended position may correspond to the open position (or an at least partially opened or non-closed position) of another door 128 of the pair. Optionally, the intermediate position may correspond to the simultaneous open positions (or an at least partially opened or non-closed positions) of both doors 128 of the pair.

It is noted that although a linear rack and pinion are illustrated, another suitable, electrically-driven system (e.g., gear train) coupled to electronic drive motor 326 may be provided to motivate camera carriage 312 between the extended and retracted positions based on the positions of the doors 128 (e.g., as indicated by a signal received at electronic drive motor 326).

Figure 11:
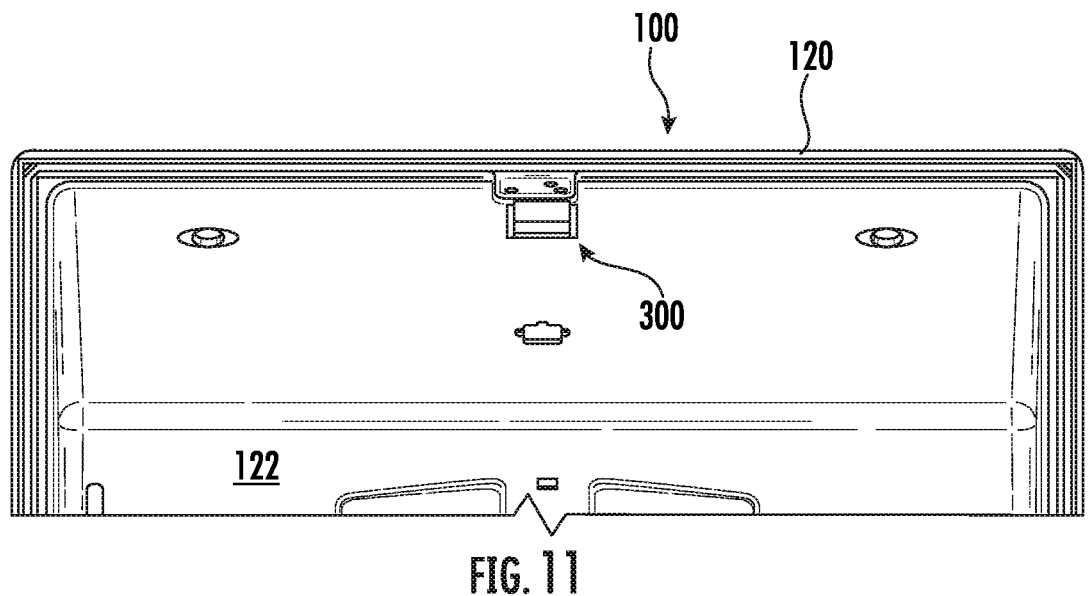
FIG. 11 provides a perspective view of a top portion of a chilled chamber and camera assembly of a refrigerator appliance according to exemplary embodiments of the present disclosure.
Figure 12:
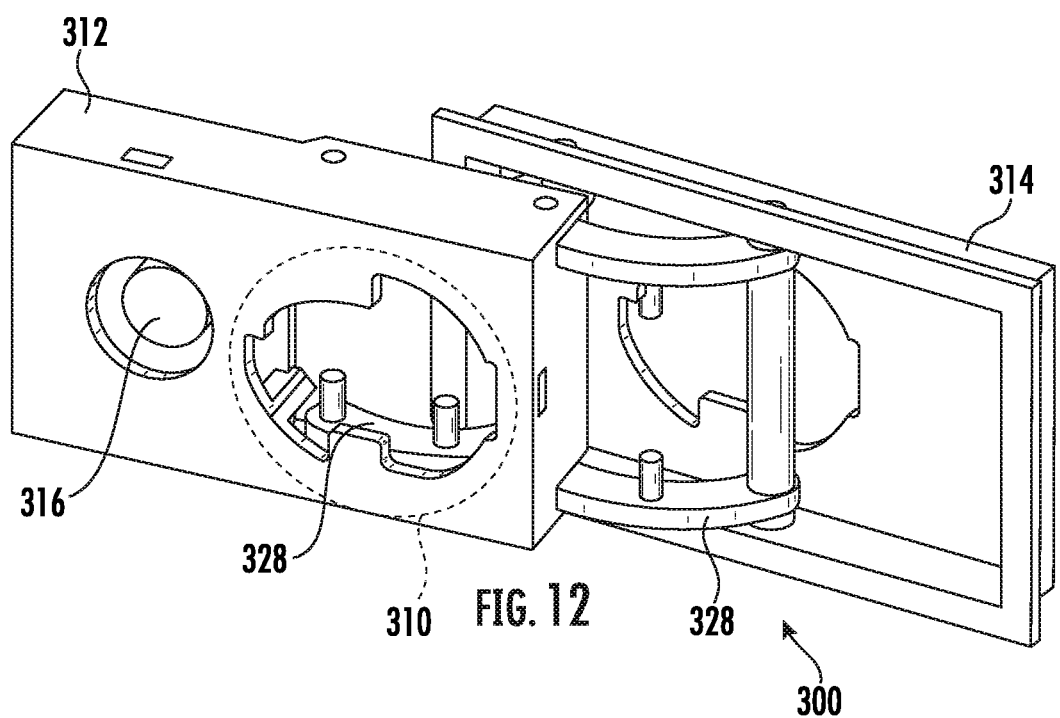
FIG. 12 provides a perspective view of a portion of the exemplary camera assembly of FIG. 11.
Figure 13:
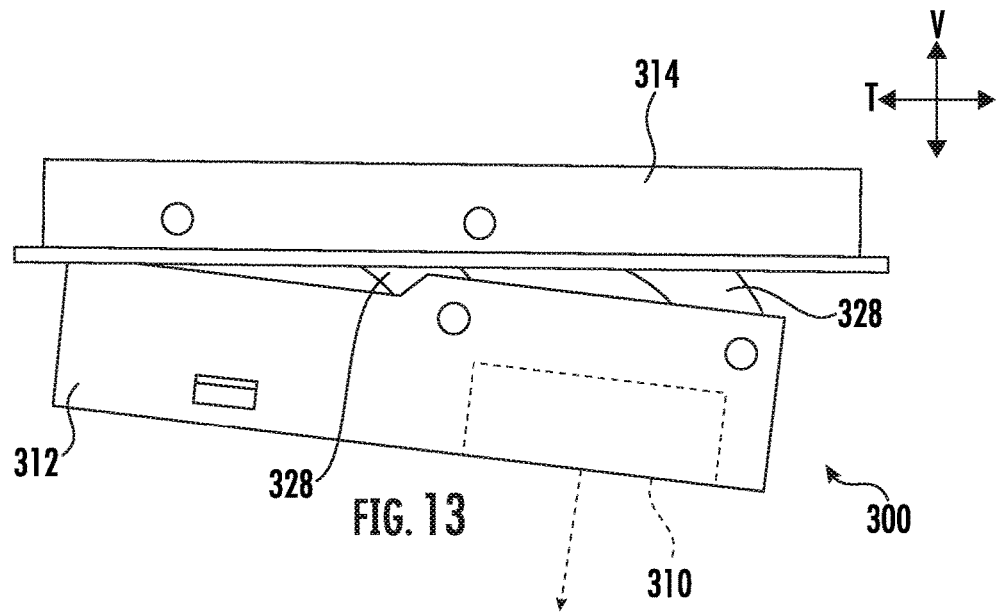
FIG. 13 provides a side perspective view of the exemplary camera assembly of FIG. 11, the camera assembly being in a retracted position.
Figure 14:
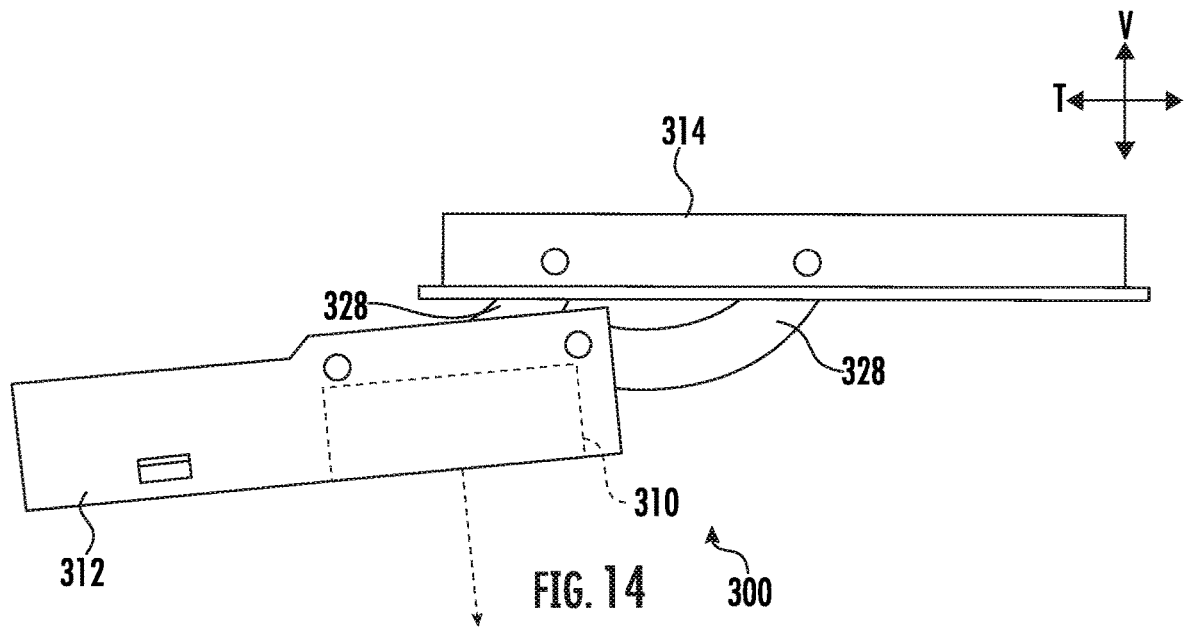
FIG. 14 provides a side perspective view of the exemplary camera assembly of FIG. 11, the camera assembly being in a retracted position.

Turning now to FIGS. 5 and 11 and 14, in some embodiments, a portion of camera assembly 300 that includes camera module 310 is movable, at least in part, along the transverse direction T (e.g., as motivated by a mechanical drive assembly 318). In other words, the predefined direction of movement may include the transverse direction T. Movement from the retracted position (e.g., FIG. 13) to the extended position (e.g., FIG. 14) may bring the camera module 310 closer to a user in front of cabinet 120. The extended position may thus include the camera module 310 proximal to the front end 103 (e.g., second end) while the retracted position includes the camera module 310 proximal to the rear end 104 (e.g., first end).

In certain embodiments, camera module 310 is supported on a camera carriage 312 that is movably (e.g., pivotably) mounted to cabinet 120 as part of camera assembly 300. Camera carriage 312 may be anchored or otherwise joined to cabinet 120 (e.g., at a portion of the internal liner defining the chilled chamber) via an assembly bracket 314 to move between the retracted position and the extended position. Optionally, one or more pivot arms 328 may connect camera carriage 312 to assembly bracket 314. Assembly bracket 314 may be fixed relative to cabinet 120 (e.g., on or more suitable adhesives, mechanical fasteners, etc.), as would be understood. When assembled, however, camera module 310 may be fixed relative to camera carriage 312 and thus is movable along the transverse direction T in tandem with camera carriage 312. For instance, at least a portion of camera module 310 may be received within a module slot defined within camera carriage 312.

In optional embodiments, one or more other features may be supported on camera carriage 312 beside camera module 310. For instance, a light source 316 may be supported on camera carriage 312 to move between the retracted position and the extended position. In some such embodiments, light source 316 is horizontally (e.g., laterally or transversely) spaced apart from camera module 310. Generally, light source 316 may be provided as any suitable (e.g., electrically powered) light emitter, such as an incandescent bulb, halogen bulb, fluorescent bulb, light emitting diode (LED), etc. When activated (e.g., in the extended position), light source 316 may illuminate at least a portion of the chilled chamber. In some embodiments, light source 316 is directed at the chilled chamber in the extended position. For instance, the extended position may include light source 316 directed to chilled chamber to illuminate the same. Advantageously, light source 316 may be generally directed at the same region as camera module 310 and, thus, provide illumination to improve the accuracy or quality of images captured at camera module 310. In optional embodiments, light source 316 provides the primary illumination for chilled chamber (e.g., in place of or in tandem with a separate stationary source of light mounted within the chilled chamber).

Generally, camera assembly 300; including camera module 310, camera carriage 312, or assembly bracket 314; may be disposed at any suitable location on cabinet 120 to capture image(s) of the chilled chamber in the extended position. In exemplary embodiments, camera assembly 300 is mounted at a top portion of cabinet 120 within the chilled chamber. For instance, camera assembly 300 may be joined to a top wall of the internal liner (e.g., at the assembly bracket 314 at top 101).

In certain embodiments, camera assembly 300 is mounted such that camera module 310 can move pivot in front of a front edge 210 (e.g., fiducial edge) of one or more shelves 144 mounted within the chilled chamber. In other words, relative to the transverse direction T, camera module 310 in the extended position may be forward from the front edge(s) 210 of one or more shelves 144. For instance, camera module 310 may be disposed between a front edge 210 and the opening or door 128 in the extended position. Additionally or alternatively, camera module 310 may be disposed forward from the opening in the extended position. The one or more shelves 144 may include the shelf 144 closest to camera assembly 300 relative to the vertical direction V (e.g., the uppermost shelf) or two or more shelves 144 (e.g., above the drawers 142). Advantageously, the extended position may hold camera module 310 at a location where a significant portion of the lower shelves 144 or drawers 142 is visible). Optionally, the retracted position may provide the camera module 310 rearward of the front edge 210 one or more shelves 144 (e.g., between a front edge 210 and rear end 104 along the transverse direction T).

In exemplary embodiments, the angle of camera module 310 (e.g., the direction of line of sight relative to a fixed direction) changes between the retracted position and the extended position. Thus, one or both of the retracted and extended positions may be nonparallel relative to the fixed direction (e.g., vertical direction V). As an example, camera module 310 may be directed forward (e.g., generally toward an opening of the chilled chamber or door 128) in the retracted position. As illustrated in FIG. 13, relative to the vertical direction V, the line of sight of camera module 310 may define an acute, nonparallel angle (e.g., forward along the transverse direction T). As an additional or alternative example, camera module 310 may be directed rearward (e.g., generally away from a door 128 or toward rear end 104). As illustrated in FIG. 14, relative to the vertical direction V, the line of sight of camera module 310 may define an acute nonparallel angle that is different from that which is defined in the retracted position (e.g., rearward along the transverse direction T).

Camera assembly 300 may include drive assembly 318 configured to motivate or bias camera carriage 312 to the extended position. As shown, a pair of pivot arms 328 having discrete arm lengths joined to camera carriage 312 at transversely spaced points on camera carriage 312 may serve to change the angle defined by the line of sight (e.g., relative to the vertical direction V) between the retracted position and the extended position. Optionally, camera carriage 312 may be selectively engaged with an inner surface of door 128 to force camera carriage 312 rearward (e.g., as door 128 closes) and hold camera carriage 312 in the retracted position while door 128 is in the closed position. Optionally, a spring (not pictured—e.g., coil spring, leaf spring, pneumatic spring cylinder, etc.) may be provided in further mechanical communication with camera carriage 312. Specifically, spring may be in biased engagement with the camera carriage 312 (including camera module 310), biasing the camera module 310 to the extended position.

As illustrated, the position of camera carriage 312 may be based on or correspond to the position of at least one door 128. For instance, the retracted position may correspond to the closed position of a matched door 128 while the extended position may correspond to the open position (or an at least partially opened or non-closed position) of the matched door 128.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance comprising:
a cabinet defining a chilled chamber;
a door being rotatably hinged to the cabinet to provide selective access to the chilled chamber;
a support shelf mounted within the chilled chamber, the support shelf extending along a transverse direction between a front edge proximal to the door and a rearward edge distal to the door; and
a camera module movably mounted to the cabinet above the support shelf, the camera module being movable on the cabinet along a predefined direction between a retracted position proximal to a first end of the cabinet and an extended position proximal to a second end of the cabinet, the camera module being directed at the chilled chamber in the extended position to capture an image thereof,
wherein the camera module is disposed between the door and the front edge of the support shelf along the transverse direction in the extended position.

2. The refrigerator appliance of claim 1, further comprising:
a camera carriage movably mounted to the cabinet, the camera carriage supporting the camera module in the retracted position proximal and the extended position; and
a light source supported on the camera carriage to move therewith between the retracted position and the extended position, the light source being directed at the chilled chamber in the extended position to illuminate the chilled chamber.

3. The refrigerator appliance of claim 1, further comprising:
a spring in biased engagement with the camera module, the spring biasing the camera module to the extended position.

4. The refrigerator appliance of claim 3, wherein the door selectively engages the camera module to hold the camera module in the retracted position.

5. The refrigerator appliance of claim 1, further comprising:
an electronic module motor in mechanical communication with the camera module, the electronic module being configured to motivate the camera module between the retracted position and the extended position based on a received input signal.

6. The refrigerator appliance of claim 1, wherein the predefined direction comprises the transverse direction, wherein the first end of the cabinet is a rear end, and wherein the second end of the cabinet is a front end spaced apart from the rear end along the transverse direction.

7. The refrigerator appliance of claim 1, wherein the predefined direction comprises a lateral direction perpendicular to the transverse direction, wherein the first end of the cabinet is a first lateral side, and wherein the second end of the cabinet is a second lateral side.

8. The refrigerator appliance of claim 7, wherein the door comprises a pair of independently movable door segments pivoted at opposite lateral sides of the cabinet, and
wherein the refrigerator appliance further comprises:
an electronic module motor in mechanical communication with the camera module, the electronic module being configured to motivate the camera module between the retracted position and the extended position based on an input signal corresponding to a pivoted position of the pair of independently movable door segments.

9. The refrigerator appliance of claim 1, wherein the camera module is disposed with the chilled chamber in the retracted position.

10. The refrigerator appliance of claim 1, wherein the camera module is directed forward in the retracted position and rearward in the forward position.

11. A refrigerator appliance comprising:
a cabinet defining a chilled chamber;
a door being rotatably hinged to the cabinet to provide selective access to the chilled chamber;
a camera carriage movably mounted to the cabinet, the camera carriage being movable on the cabinet along a predefined direction between a retracted position proximal to a first end of the cabinet and an extended position proximal to a second end of the cabinet;
a camera module supported on the camera carriage to move therewith between the retracted position and the extended position, the camera module being directed at the chilled chamber in the extended position to capture an image of the chilled chamber; and
a light source supported on the camera carriage to move therewith between the retracted position and the extended position, the light source being directed at the chilled chamber in the extended position to illuminate the chilled chamber.

12. The refrigerator appliance of claim 11, further comprising:
a spring in biased engagement with the camera carriage, the spring biasing the camera module to the extended position.

13. The refrigerator appliance of claim 12, wherein the door selectively engages the camera carriage to hold the camera carriage in the retracted position.

14. The refrigerator appliance of claim 11, further comprising:
an electronic module motor in mechanical communication with the camera module, the electronic module being configured to motivate the camera module between the retracted position and the extended position based on a received input signal.

15. The refrigerator appliance of claim 11, wherein the predefined direction comprises the transverse direction, wherein the first end of the cabinet is a front end, and wherein the second end of the cabinet is a rear end spaced apart from the front end along the transverse direction.

16. The refrigerator appliance of claim 11, wherein the predefined direction comprises a lateral direction perpendicular to the transverse direction, wherein the first end of the cabinet is one lateral side, and wherein the second end of the cabinet is one other lateral side.

17. The refrigerator appliance of claim 16, wherein the door comprises a pair of independently movable door segments pivoted at opposite lateral sides of the cabinet, and wherein the refrigerator appliance further comprises:
an electronic module motor in mechanical communication with the camera carriage, the electronic module being configured to motivate the camera carriage between the retracted position and the extended position based on an input signal corresponding to a pivoted position of the pair of independently movable door segments.

18. The refrigerator appliance of claim 11, wherein the camera module is disposed with the chilled chamber in the retracted position.

19. The refrigerator appliance of claim 11, wherein the camera module is directed forward in the retracted position and rearward in the forward position.

* * * * *